United States Patent [19]

Butler et al.

[11] Patent Number: 5,528,677
[45] Date of Patent: Jun. 18, 1996

[54] SYSTEM FOR PROVIDING COMMUNICATIONS SERVICES IN A TELECOMMUNICATIONS NETWORK

[75] Inventors: Thomas W. Butler, Lenexa; Lloyd K. Hacker, Spring Hill; Sanjiv B. Jadhav, Overland Park, all of Kans.; Alan B. Jessup, Blue Springs, Mo.; Renee J. Keffer, Overland Park, Kans.; Isaac W. Lamm; Michael A. O'Brien, both of Olathe, Kans.; Charles C. Weber, Stilwell, Kans.

[73] Assignee: Sprint Communications Company L.P., Kansas City, Mo.

[21] Appl. No.: 212,627

[22] Filed: Mar. 11, 1994

Related U.S. Application Data

[63] Continuation-in-part of Ser. No. 877,677, May 1, 1992, abandoned.

[51] Int. Cl.[6] .................................................. H04M 3/42
[52] U.S. Cl. .......................... 379/196; 379/201; 379/207; 379/221
[58] Field of Search ........................... 379/201, 207, 379/211, 210, 212, 88, 89, 196, 216, 221, 202

[56] References Cited

U.S. PATENT DOCUMENTS

| | | | |
|---|---|---|---|
| 5,012,511 | 4/1991 | Hanle et al. | 379/211 |
| 5,136,581 | 8/1992 | Muehrcke | 379/202 |
| 5,222,125 | 6/1993 | Creswell et al. | 379/201 |
| 5,222,128 | 6/1993 | Daly et al. | 379/221 |
| 5,416,833 | 5/1995 | Harper et al. | 379/201 |

*Primary Examiner*—Jeffery A. Hofsass
*Assistant Examiner*—Scott Wolinsky
*Attorney, Agent, or Firm*—Harley R. Ball; Michael J. Setter

[57] ABSTRACT

A configuration for a telecommunications network is disclosed in which service requests from subscribers are received into the network in a service manager which distributes the requests to appropriate service modules for composition of network instructions usable by network elements for providing telecommunications services corresponding to the requests.

19 Claims, 17 Drawing Sheets

SYSTEM FOR PROVIDING COMMUNICATIONS SERVICES IN A TELECOMMUNICATIONS NETWORK

BACKGROUND OF THE INVENTION

This is a Continuation-in-Part of Application Ser. No. 07/877,677 filed May 1, 1992, now abandoned.

1. Field of the Invention

The present invention relates to the field of telecommunications. More particularly, the invention concerns a method of operating a telecommunications network whereby subscribers change in service requests are received directly into the network and handled thereby to implement the requested service.

2. Description of the Prior Art

Telecommunications networks can provide a wide variety of communications services to subscribers including, for example, data transmission, destination billing services such as 800 and 900 prefix calls, dedicated private line, video transmission, and special billing services. Moreover, the capacity exists to provide other services yet to be developed.

In the prior art, the processes for implementing or changing services can be unwieldy. For example, if a subscriber wishes to change the destinations of 800 calls, the subscriber must work with someone skilled in network operations who then composes a decision tree based upon the desired change. This decision tree is then converted into instructions usable by network elements such as switches for implementing the change.

Furthermore, network elements such as switches produced by different vendors are typically incompatible with one another because of different communication protocols. Because of this, the process for implementing or changing service is even more difficult because separate instructions may be required for each set of incompatible network elements.

SUMMARY OF THE INVENTION

The present invention solves the prior art problems outlined above, among others, and provides a distinct improvement in the state of the art. More particularly, the invention hereof allows a subscriber to enter service requests concerning communications services directly into a telecommunications network whereupon the requests are processed and implemented quickly and reliably.

Broadly, the preferred embodiment concerns a method of operating a telecommunications network wherein a plurality of service modules are configured for processing service requests concerning corresponding communications services. Service requests are received in the network by way of a service manager. This service manager determines which of the service modules are operable for processing requests and selects these appropriate modules for transfer of the requests thereto. Upon receipt of a service request, a selected service module develops network instructions usable by the network for implementing the corresponding services. These instructions are then provided to the network elements for use therein for providing the requested services.

In preferred forms, an access manager initially receives service requests before receipt thereof by the service manager. The access manager determines whether a subscriber is authorized to present service requests and also determines whether the requested services are authorized before transmitting the requests to the service manager. Other preferred aspects of the present invention are disclosed herein.

DETAILED DESCRIPTION OF THE PREFERRED EMBODIMENT

Figure 1:
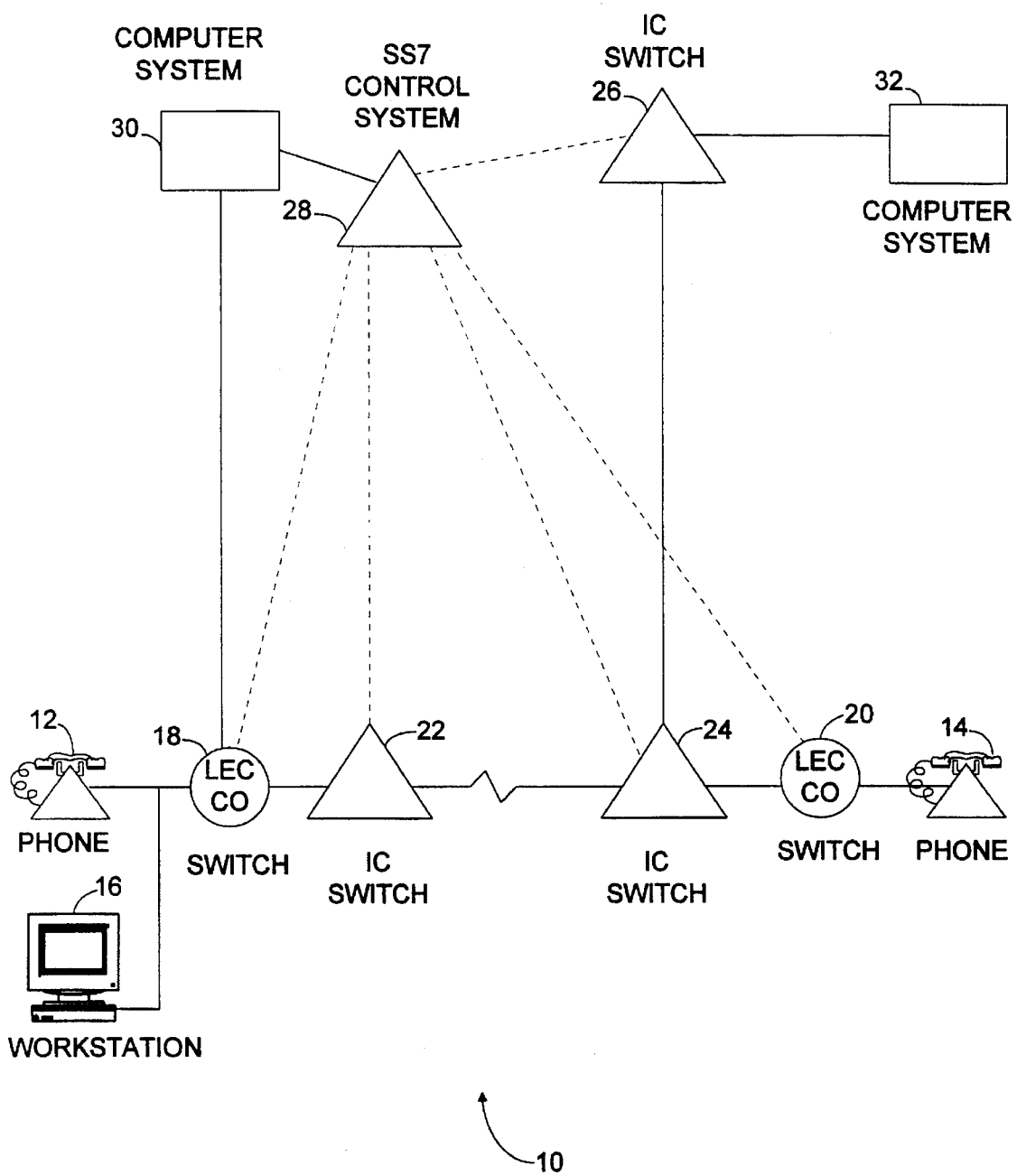
FIG. 1 is a schematic representation of a telecommunications network for use with the present invention.
Figure 2A:
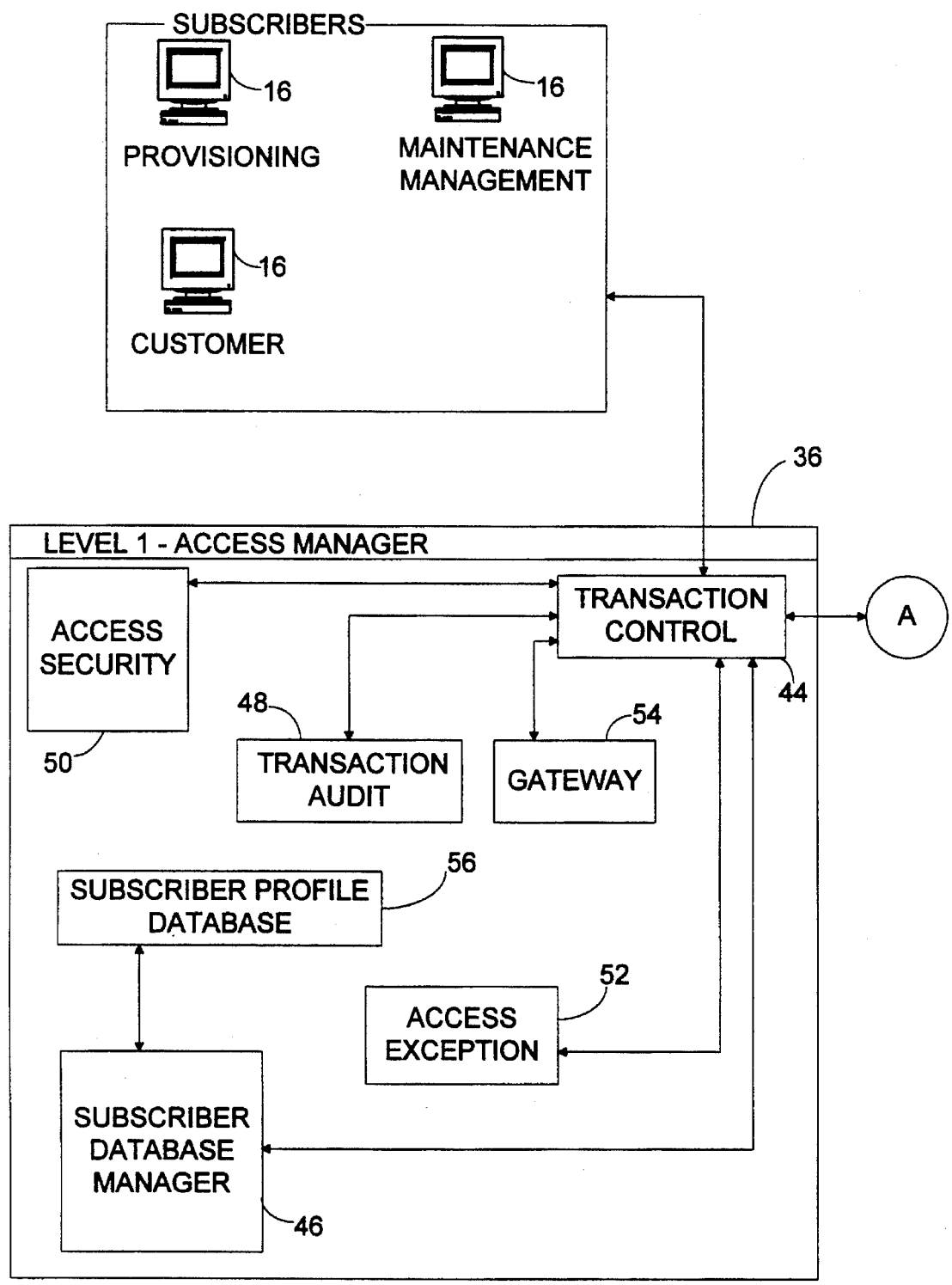
FIGS. 2A–2D are a schematic representation of the preferred operational architecture for implementing the present invention.
Figure 2B:
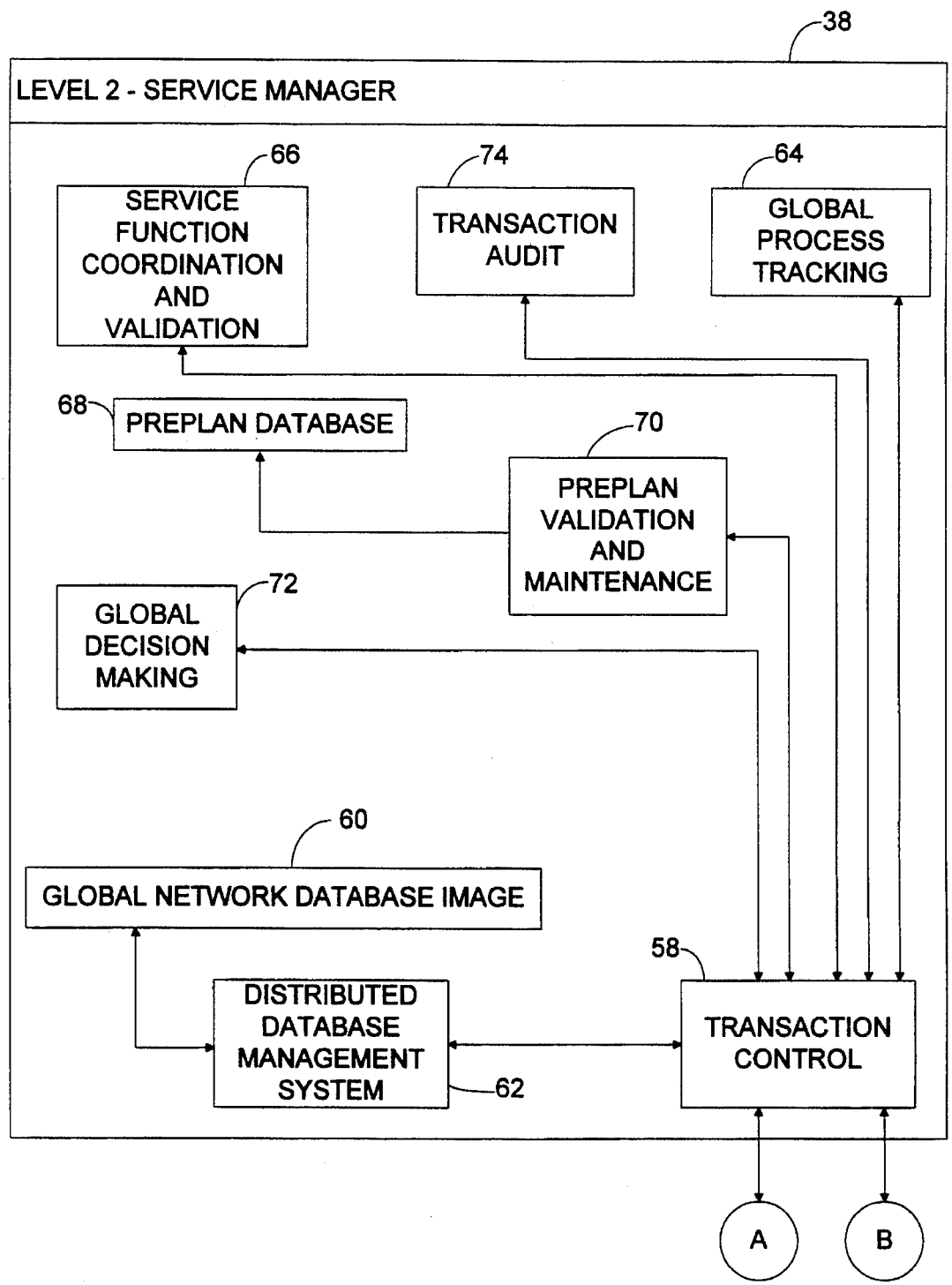
Figure 2C:
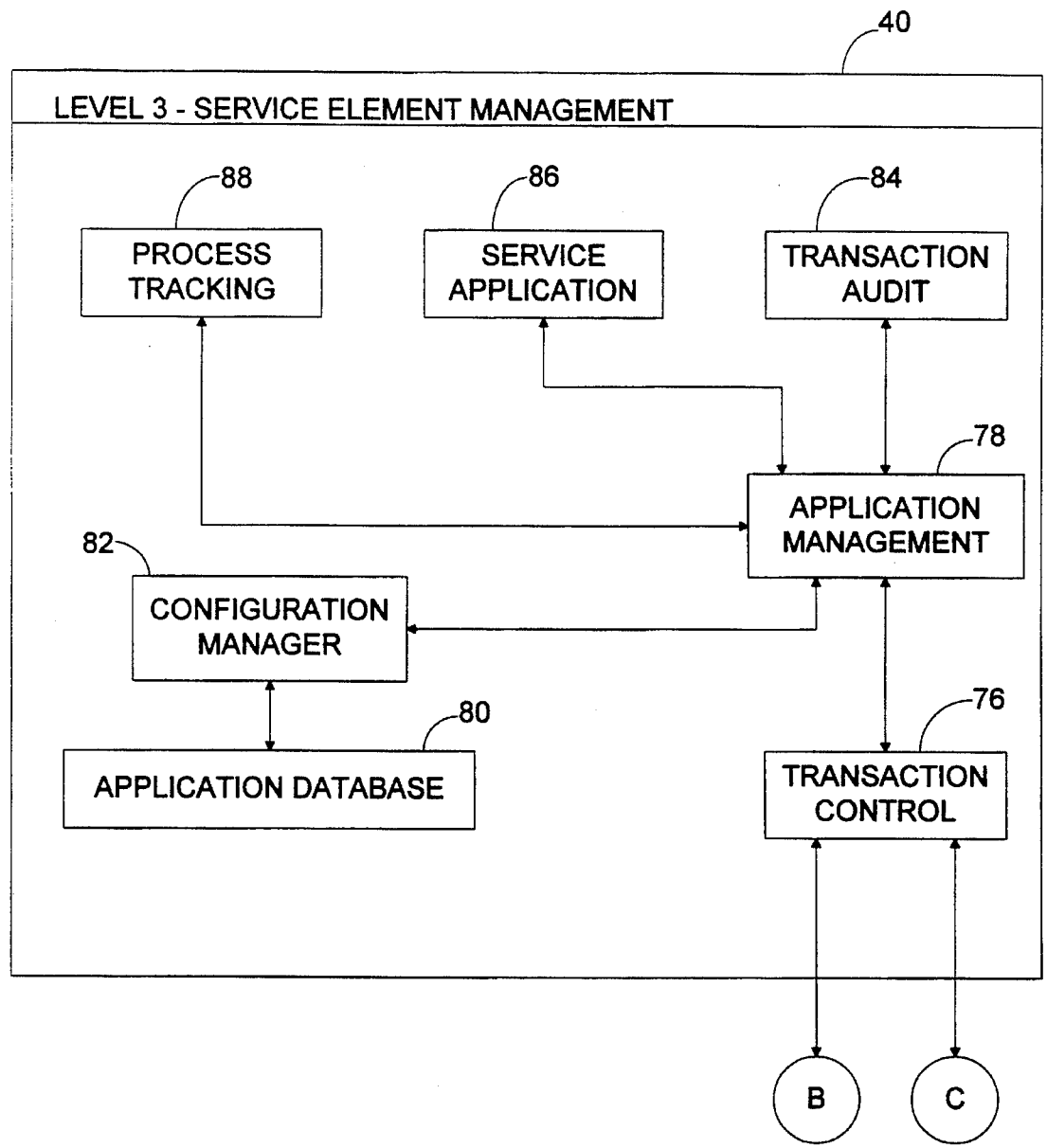
Figure 2D:
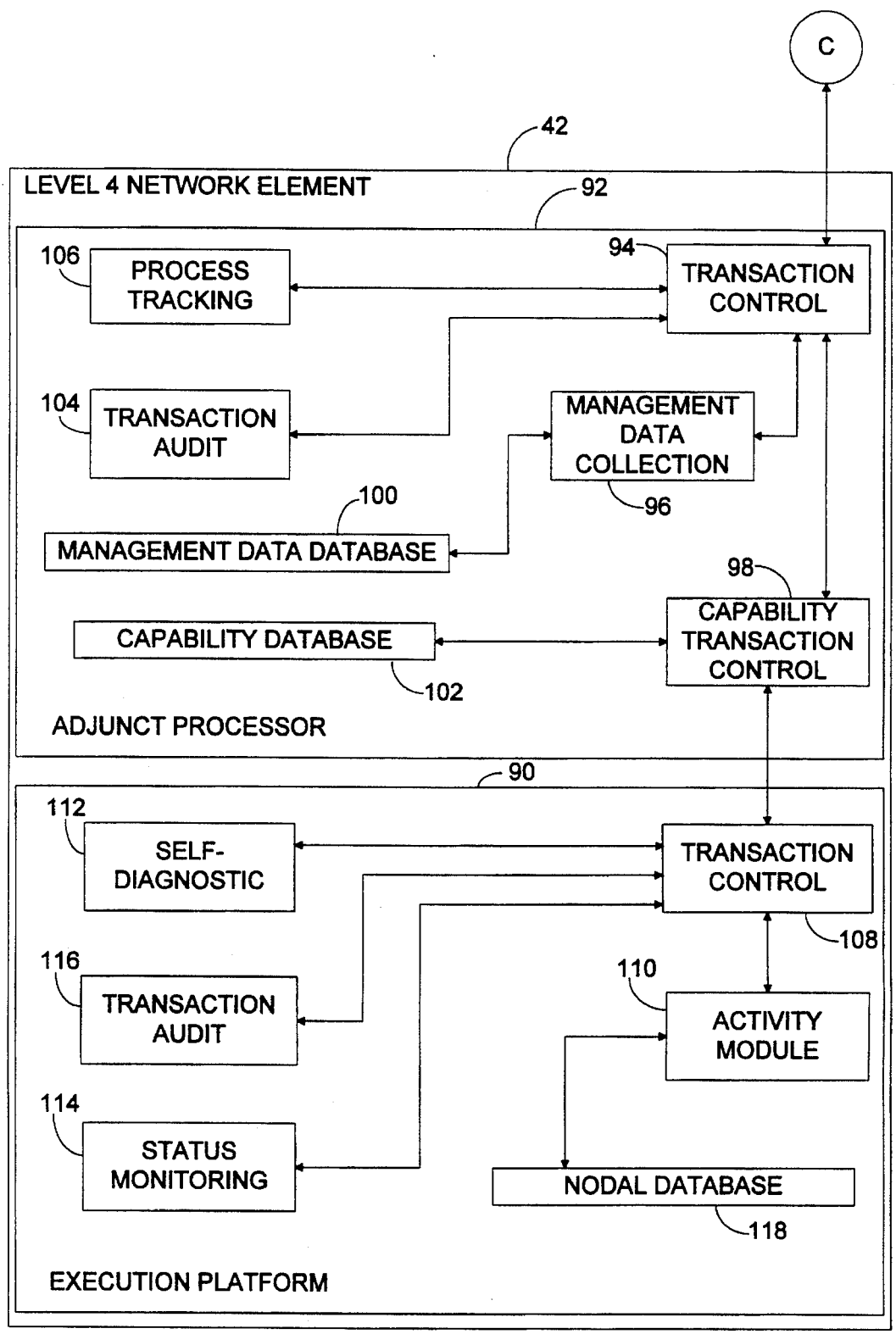

FIG. 1 is a schematic representation of a telecommunications network 10 including network access stations 12 and 14 with station 12 also including universal access terminal workstation 16, local exchange carrier (LEC) central office (CO) switches 18 and 20, interexchange carrier (IC) switches 22, 24 and 26, service control system (SS7) 28, and computers 30 and 32. As those skilled in the art will appreciate, FIG. 1 is a representation of a telecommunications network having many access stations, switches, control system and other nodes, and computers integrated as part of the network and having access to the network.

FIGS. 2A–2D are a schematic representation of the preferred operational configuration or architecture of network 10 for providing communications services to subscribers. The term "subscribers" as used herein includes network customers as well as network personnel and others needing access to the network. Referring to FIGS. 2A–2D, this operational architecture is configured to include a plurality of access terminals 16, access manager 36 (level 1) which is logically one but can be distributed, service manager 38 (level 2), service element managers 40 (level 3), and network elements 42 (level 4) which include switches 18–26, SS7 control system 28 and other network elements discussed further hereinbelow.

In general, a subscriber enters a service request by way of access terminal 16. A service request may include, for example, a change in the destinations of "800" calls, an increase in bandwidth of a dedicated private line for video transmission, or a change in billing format. A service request as a transaction is first communicated to an associated access manager 36 which screens the request for security and authorization. Access manager 36 passes approved requests to service manager 38 which receives, manages and controls substantially all requests entering the network and determines which components of service element managers 40 are required to implement the request. Service element managers 40 process a request and thereby develops instructions such as routing statements for "800" calls usable by the network elements for implementing the requests. These instructions are then passed to the appropriate network element 42 such as SS7 control system 28 of FIG. 1, of a switch so that the desired communications services can be provided over network 10.

Universal access terminals 16 are conventional work stations such as personal computers and require no operational intelligence regarding network functions. Terminals 16 are independent of vendor and type by preferably including a standardized multi-function operating environment such as "windows" and multi-tasking applications, and use a standardized interface with access manager 36. Terminals 16 can access any network function defined in the associated subscriber profile maintained in the corresponding access manager 36. In the illustration of FIG. 1, terminal 16 communicates with network 10 through LEC CO switch 18 to the point of presence of the interexchange carrier (IC switch 22) or through similar access methods using data networks. For example, terminal 16 access may be dial-up, electronic mail or other methods.

Referring now to FIGS. 2A–2D, access manager 36, service manager 38, and service element managers 40 reside in network 10 preferably on various platforms such as computers 30 and 32 (FIG. 1). Access manager 36 is the point of interface between terminal 16 and network 10 using standardized interface protocols. In general, access manager 36 stores a profile of available subscriber services, provides access security and the gateway function into the network and to the network services, and provides transaction management for service requests.

More particularly, access manager 36 presents a plurality of operational components including transaction control 44, subscriber database manager 46, transaction audit 48, access security 50, access exception 52, gateway 54, and subscriber profile database 56. Transaction control 44 manages transactions between consecutive levels of the architecture and routes a transaction between or within components of a level. Additionally, transaction control 44 determines when a transaction is complete, passes it to the next level for further processing, performs message error checking and manages security between levels.

Subscriber database manager 46 manages and maintains subscriber profile database 56 by updating data stored therein, checking integrity of the data and providing information concerning the subscriber profile as requested. Transaction audit 48 maintains archived records of transaction processing, detects and logs processing errors and provides messages to subscribers concerning the reason for a failed transaction.

Access security 50 initially receives all transactions for determining whether the subscriber has entered the proper identification password and further determines whether the service request entered by the subscriber is authorized as set forth in the subscriber profile. This component also communicates with access exception 52 to notify a subscriber if the requested service is not authorized, and notifies transaction control 44 to pass a transaction to service manager 38 when the security checks have been satisfied.

Access exception 52 provides subscribers with standardized messages if requested transactions are not within the authorized profile and further provides direct connection to a customer representative when a request is denied. Gateway 54 provides interface and protocol conversion as required for non-standard subscriber terminals 16.

Subscriber profile database 56 stores access privilege information for each subscriber including service delivery locations, accessible services and features, currently allowed privileges, or privileges which may be upgraded such as increased bandwidth for video transmission, and subscriber service center information. This database also includes subscriber passwords, identification numbers for particular terminal users, and the necessary information for delivery of exception messages.

Service manager 38 is configured to receive substantially all service requests which enter the network and, in general, provides overall transaction management to determine which components of service element managers 40 are required to process a given service request. Service manager 38 can store predetermined communications services plans associated with a subscriber of the network These subscriber-specific preplans can be implemented upon a subscriber request or upon a network disruption. Additionally, particular preplans can be designated and implemented in the event of a network disruption. More particularly, service manager 38 presents operational components including transaction control 58, global network database image 60, distributed database management system 62, global process tracking 64, service function coordination and validation 66, preplan database 68, preplan validation and maintenance 70, global decision making 72, and transaction audit 74.

Transaction control 58 receives and transmits service requests received by service manager 38 and distributes the requests internally or externally.

Global network image database 60 stores information for determining where data resides within the operational architecture. That is to say, image database 60 functions somewhat as a "master" database storing information concerning which service element managers 40 are required to implement or process a given service request. As those skilled in the art will appreciate, service element managers 40 may be distributed throughout or connected to network 10 on various platforms such as computers 30, 32. Image database 60 contains information as "pointers" necessary for service manager 38 to distribute service requests to the appropriate service element managers 40. Additionally, image database 60 supports management system 62 for synchronizing database changes across multiple applications and provides information required by service function coordination and validation 66 and global decision making 72 to complete their tasks.

Global process tracking 64 monitors the progress of a transaction through the operational architecture to completion, assimilates tracking and audit information from other levels, and reconstructs transactions as needed. Additionally, global process tracking 64 provides subscribers with messages indicating completed transactions or the reasons for incomplete transactions with recommendations for resubmission.

Service function coordination and validation 66 coordinates, synchronizes and sets priorities for multiple actions through a plurality of service element managers 40 relating to a given service request. Further, this component interacts with global decision making 72 to develop recommendations on transactions that cannot be completed. For example, 800 routing control service software would be within validation 66.

Preplan database 68 stores subscriber-specific service plans already developed and ready for implementation upon request. A preplan might include, for example, an alternative routing plan for 800 calls for the event that a specific subscriber destination is out of service unexpectedly. Preplan Validation and maintenance 70 analyzes subscriber requested preplans in view of the capabilities of the operational architecture and the network 10, acknowledges the validity of preplans to subscribers, and notifies a subscriber when a preplan is invalid or becomes invalid due to changes in the capabilities of the operational architecture or network 10. Additionally, this component coordinates with global decision making 72 to determine alternate preplans if a requested preplan is invalid, and maintains other valid preplans for implementation when required due to subscriber or network problems.

Service element managers 40 are distributed throughout network 10 on various platforms or components as appropriate such as computers 30 and 32. In general, service element managers 40 receive and process service requests under the management of service manager 38 to develop instructions or data usable by network elements 42 for implementing the requested service or service change. The capabilities of service element managers 40 include, for example, changing of the bandwidth on dedicated private lines, composing decision trees and routing statements for control of destination billed calls such as 800 calls, changing billing procedures and so forth. The preferred service modules are modular and application oriented, and are vendor and hardware independent through the use of standard modules and communication protocols. A typical module includes an associated database which is object oriented.

More particularly, a typical service element manager 40 includes transaction control 76, application manager 78, application database 80, configuration manager 82, transaction audit 84, service application 86 and process tracking 88. Transaction control 76 provides the interface with service manager 38 and network element 42, and with the internal components of managers 40. Transaction control 76 also assures technician access to network element 42 does not permit access to service element managers 40 or other portions of network 10, and supports update of application database 80 by network element 42 in the event that service element managers 40 is out of service at any time.

Application management 78 monitors and controls the processing within service element managers 40 and more particularly coordinates functions within the module to the requested transactions. Additionally, this component preprocesses information before delivery to service manager 38 and controls the flow of information therewith including changes internally of service element managers 40 and changes concerning the status of network elements 42.

Application database 80 maintains pertinent data concerning each network element 42 such as the format and communications protocol for delivery of instructions. Additionally, database 80 provides pointers and functions for database information required for processing a service request. Configuration manager 82 manages and maintains database 80 by ensuring currency of the data therein with that of network elements 42. Application 86 provides the actual processing of service requests into network instructions using data supplied by database 80.

Network elements 42 include, for example, LEC and IC switches 18–26 for providing switched communications services within network 10 and also include elements for non-switched services such as SS7 control system 28, LEC databases, billing services, bandwidth control, and so forth. A typical network element includes an execution platform 90 such as a DMS250 switch which performs an actual service function, and an adjunct processor 92 which is a high speed computer providing added intelligence to the execution platform.

Adjunct process 92 includes transaction control 94, management data collection 96, capability transaction control 98, management database 100, capability database 102, transaction audit 104, and process tracking 106. Management data collection 96 collects, filters, and provides threshold management for information from service element managers 40, execution platform 90, or within adjunct processor 92. Data collection 96 also maintains management database 100 and provides local analyses of management data for trouble determination and reporting to transaction control 98 and to service element managers 40.

Capability transaction control 98 controls the intelligence functions within network element 42, assimilates management information resulting from service delivery within execution platform 90, monitors the status of execution platform 90 and communicates with service element managers 40. Capability transaction control 98 also provides required control messages to execution platform 90 for implementing communications service in accordance with subscriber requests.

Management database 100 contains the managed information objects for management by service element managers 40 and provides the data dictionary or pointers needed for management information in the database of execution platform 90. Capability database 102 contains the data for service capabilities resident in network element 42 and contains the pointers to the database of platform 90 related to these capabilities.

Transaction audit 104 maintains records for management and control transactions accepted into network element 42 through transaction control 94. Process tracking 106 monitors the progress of a management or control transaction within network element 42 and returns progress reports back to service element managers 40.

Execution platform 90 includes transaction control 108, activity module 100, self-diagnostic 112, status monitoring 114, transaction audit 116, and nodal database 118. Transaction control 108 provides the interface with capability transaction control 98 and with the internal components of platform 90.

Activity module 110 manages and controls the activity within the platform, completes the actions required by subscriber requests, tracks completion of the actions, or reports incomplete actions to capability transaction control 98. Additionally, module 110 manages and maintains nodal database 118. Transaction audit 116 maintains records for management and control transactions accepted into execution platform 90 through transaction control 108.

Self diagnostic 112 continuously tests and monitors the status of platform 90, archives information concerning the performance thereof, and reports any hardware or software troubles to activity module 108 through transaction control 108. Status and monitoring 114 continuously monitors the alarm and performance information received from self-diagnostic 112, through transaction control 108, monitors the action performance of platform 90 and reports any performance parameter violations to activity module 110. Nodal database 118 stores data related to local configurations, stores local management data and stores local feature data.

Figure 3A:
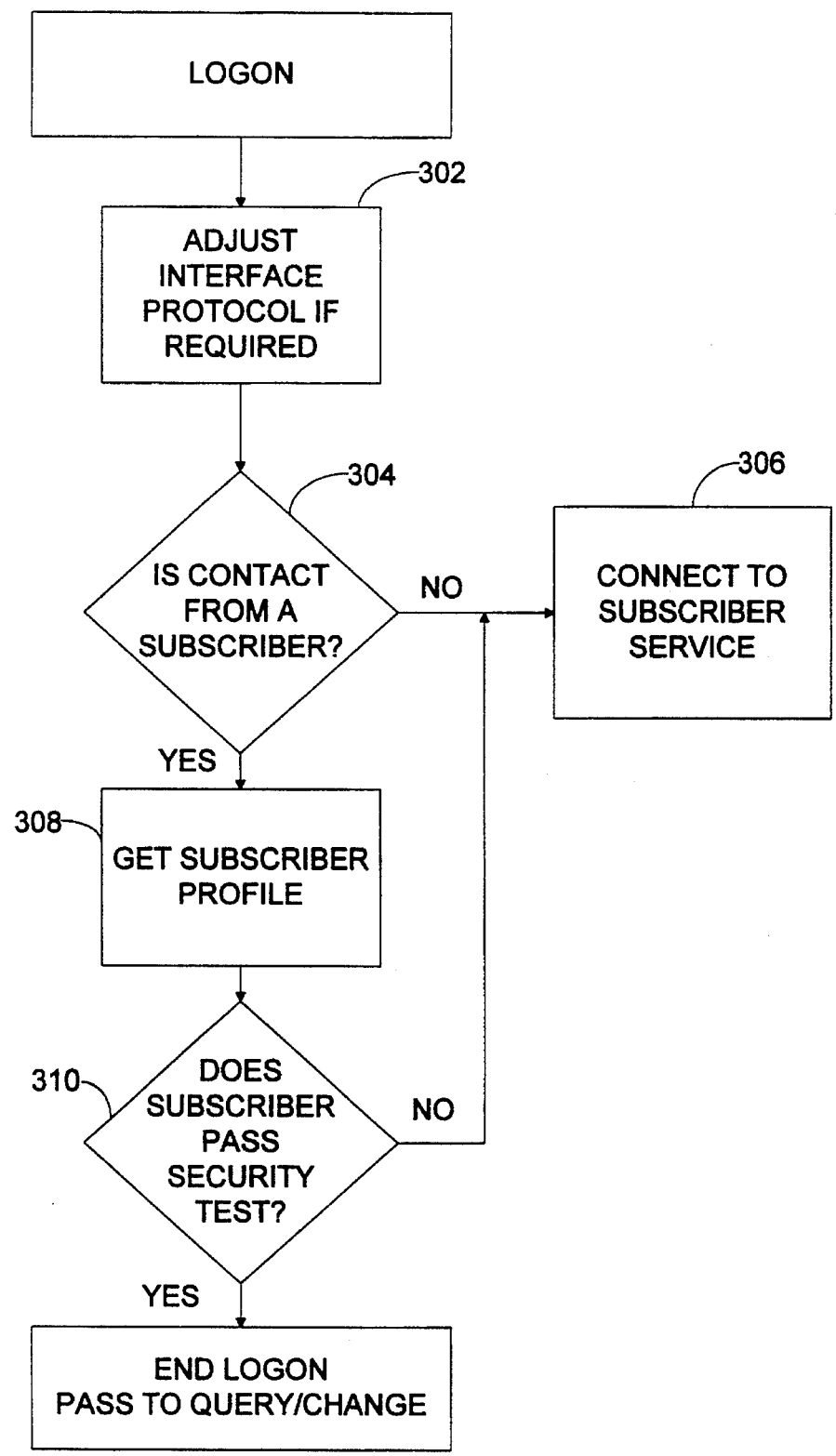
FIG. 3A is a flow diagram illustrating the log-on process for the access manager of FIG. 2A.
Figure 3B:
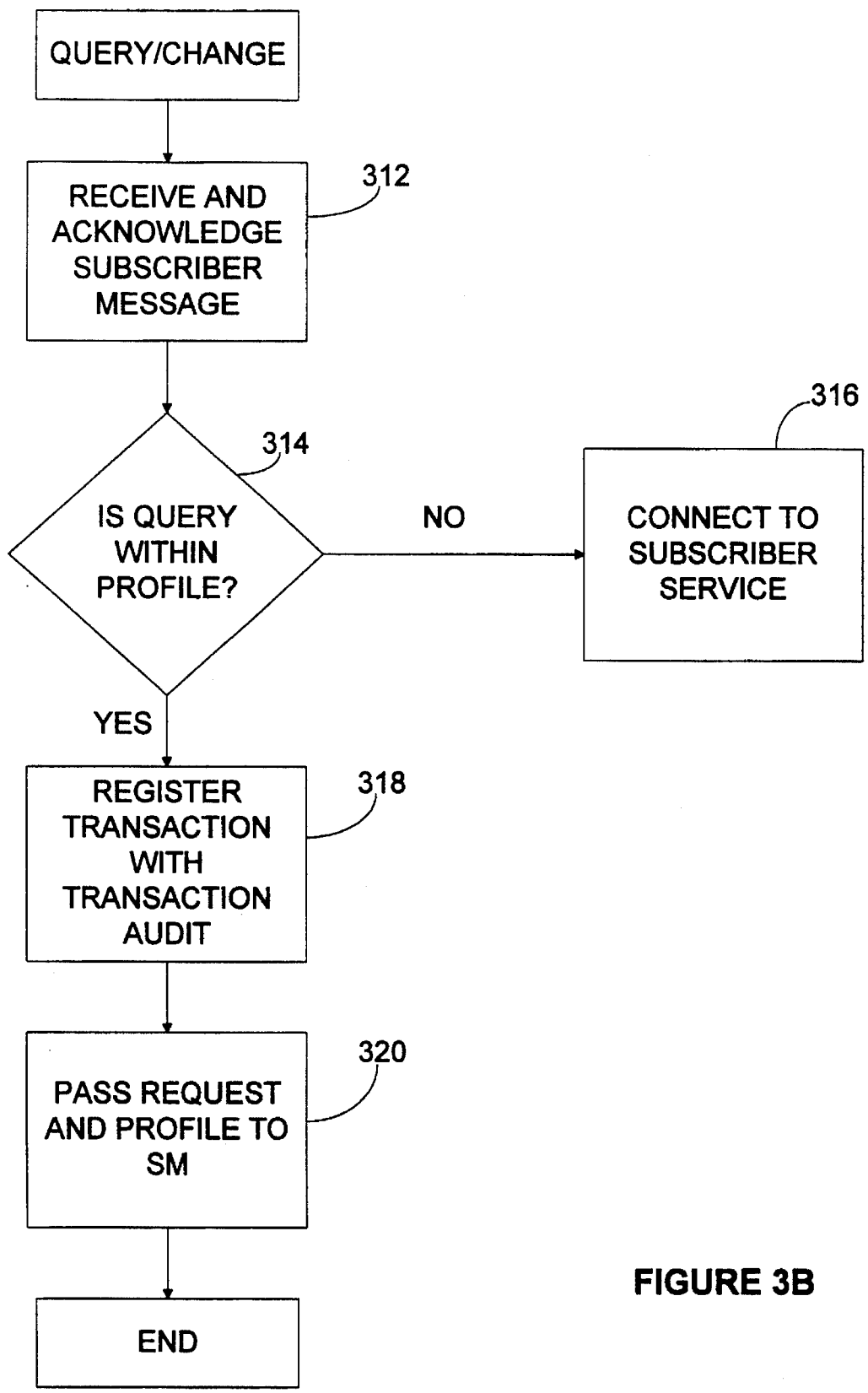
FIG. 3B is a flow diagram illustrating the query/change process for the access manager.
Figure 3C:
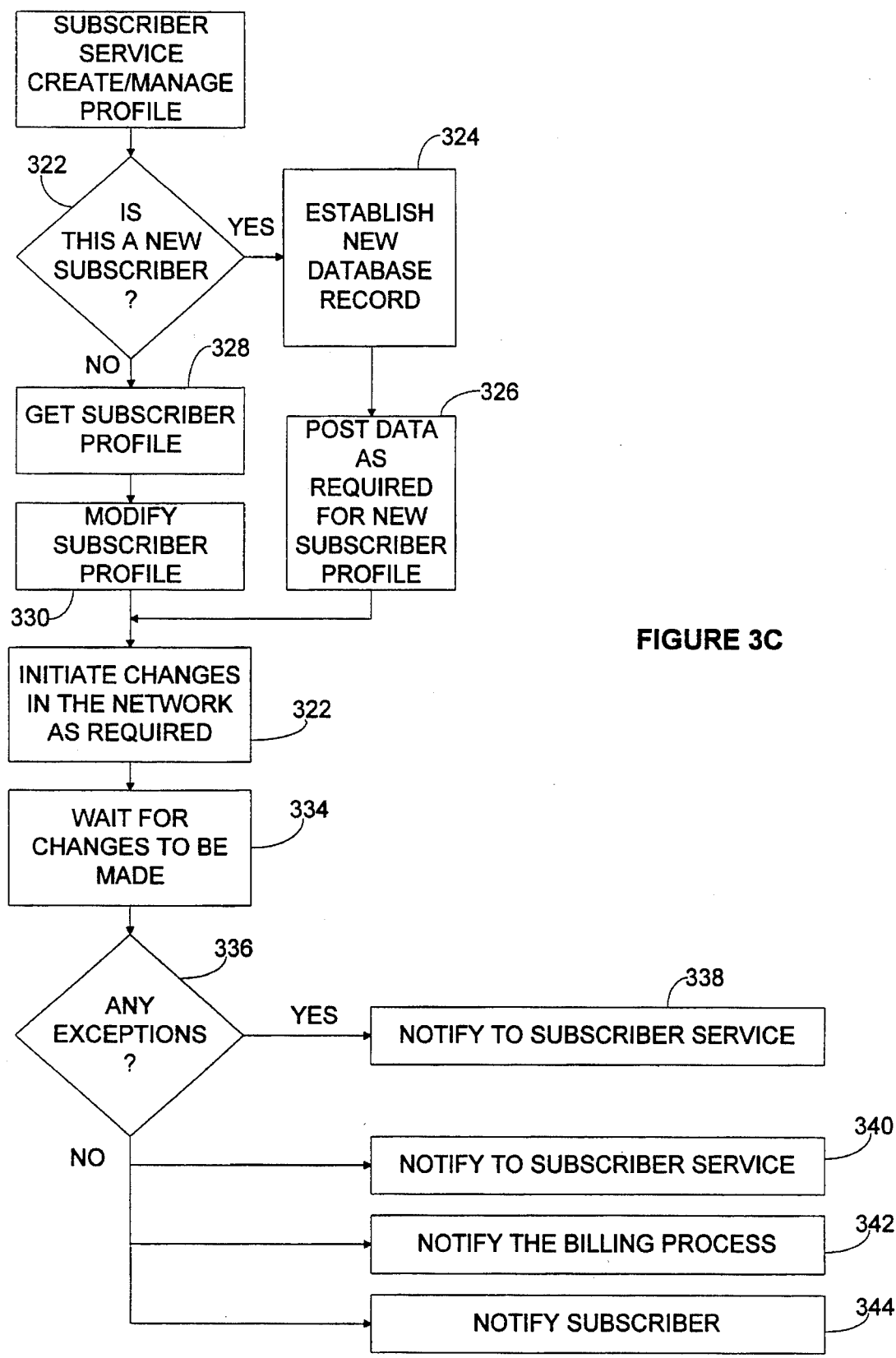
FIG. 3C is a flow diagram illustrating the process for subscriber interface for the access manager of FIG. 2A.

Turning now to the operation of the operational architecture, FIGS. 3A–C are flow diagrams illustrating the interaction between terminals 16 and access manager 36. More particularly, FIG. 3A illustrates the initial log-on procedure for subscribers by way of terminals 16. In some cases, log-on occurs only once and a subscriber remains on line indefinitely. This portion of the operation enters at step 302 in which the interface protocol presented by terminal 16 is adjusted if non-standard. Step 304 next asks whether the contact is from a subscriber by determining whether the recognized identification number has been entered by the terminal user. If no, step 306 connects the terminal user with a customer service representative.

If the answer in step 304 is yes, step 308 retrieves the subscriber profile from database 56 of access manager 36. Step 310 then asks whether the subscriber has passed the security test by entering the proper password or through other methods of determination. If no, the subscriber is connected to a service representative in step 306. If the answer in step 310 is yes, this portion of the operation ends.

After log-on, subsequent transactions are normally service requests for changing an existing service, adding new service, or for responding to a subscriber query as illustrated in FIG. 3B. In step 312, a subscriber's transaction is received and acknowledged by way of transaction control 44. Step 314 then asks whether the subscriber query, i.e., service request, is within the authorized profile stored in database 56. If no, the subscriber is connected with a service representative in step 316. If the answer in step 314 is yes, step 318 registers the transaction with the transaction audit 48. Step 320 then passes the service request along with the subscribers profile to transaction control 44 for subsequent handling.

FIG. 3C is a flow diagram illustrating the process for managing a subscriber profile by subscriber database manager 46 of access manager 36. This process enters at step 322 which asks whether the subscriber is new to the system. If yes, step 324 establishes a new database record from the available information and then step 326 posts this data as required to create a new subscriber profile in database 56. If the subscriber is existing, the answer in step 322 is no, and step 328 retrieves the associated profile from database 56 whereupon step 330 modifies the profile as appropriate to reflect any additions or changes.

After steps 326 or 330, step 332 initiates transactions within the operational architecture as appropriate to reflect the changes in the subscriber profile. Such changes are initiated by passing the appropriate service request from transaction control 44 to transaction control 58 of service manager 38. Step 334 then waits for the changes to be implemented.

Step 336 then asks whether any exceptions to the service requests have been noted by the operational architecture. In other words, this step asks whether any messages have been received from any of service element managers 40 indicating that modifications cannot be fully implemented. If any exceptions are noted, subscriber service is notified in step 338. If no exceptions have occurred indicating that the new profile has been fully implemented, steps 340, 342, and 344 respectively notify subscriber service, the appropriate service element managers 40 for billing, and notify the subscriber of the completion by way of terminal 16.

Figure 4A:
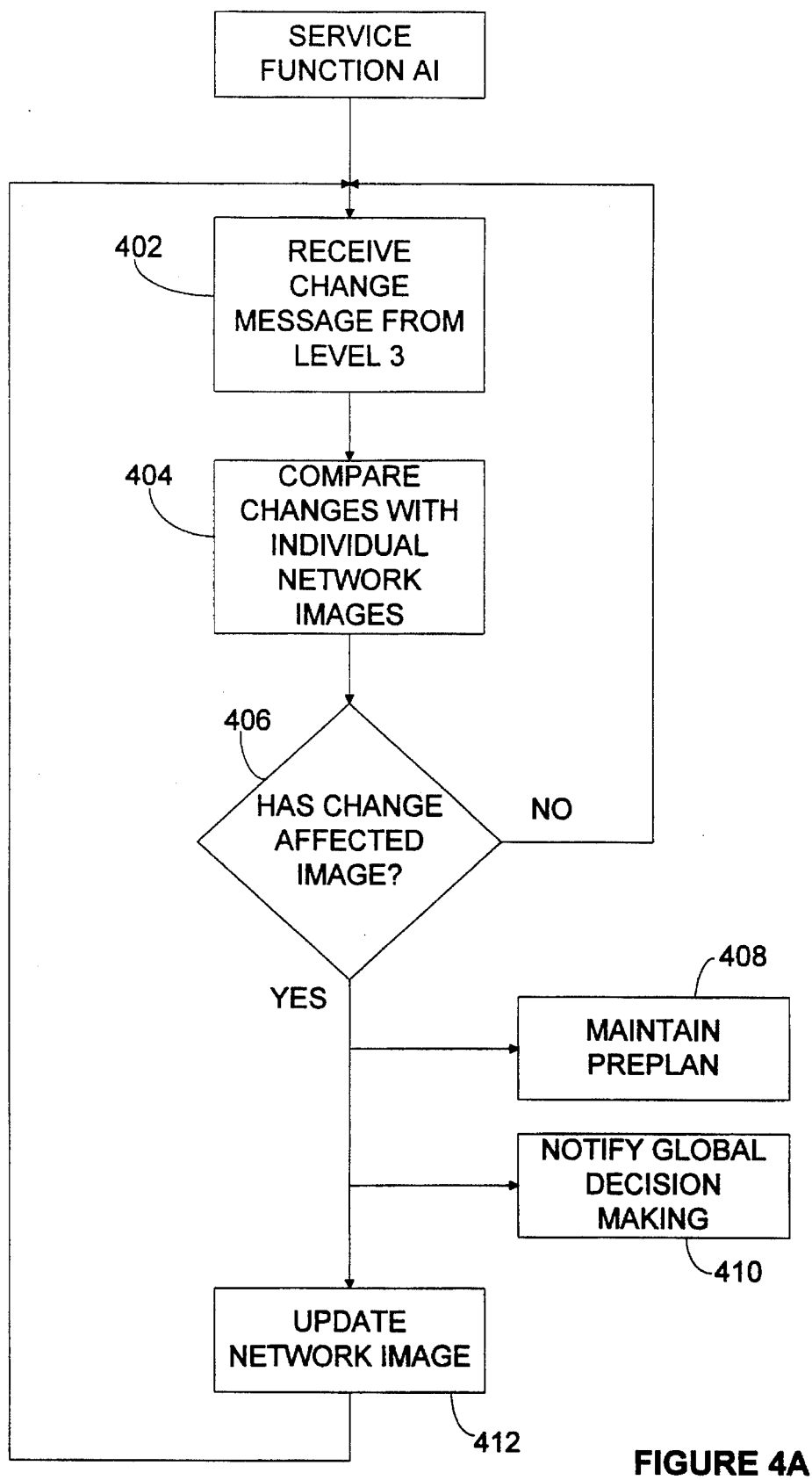
FIG. 4A is a flow diagram illustrating the process for maintaining the service image of the subscriber in the service manager of FIG. 2B.

FIGS. 4A–D concern those aspects of service manager 38 dealing with the global image preplans and transaction control. More particularly, FIG. 4A illustrates the process for changing the data in global network image database 60 and begins at step 402 which receives a change message from service element managers 40. Global decision making 72 then compares the changes with the network image stored in database 60 in step 404. Next, step 406 then asks whether the change has affected the image, and if no, the operation loops back to step 402 in order to process the next change message. If the answer in step 406 is yes indicating that the change affects the network image, then this change must be posted by way of preplan validation and maintenance 70 so that affected preplans can be marked for modification. This occurs in step 408. Additionally, the change must be posted by way of global decision making 72 which occurs in step 410. Finally, step 412 updates the network image and the process loops back to step 402 to process further changes.

Figure 4B:
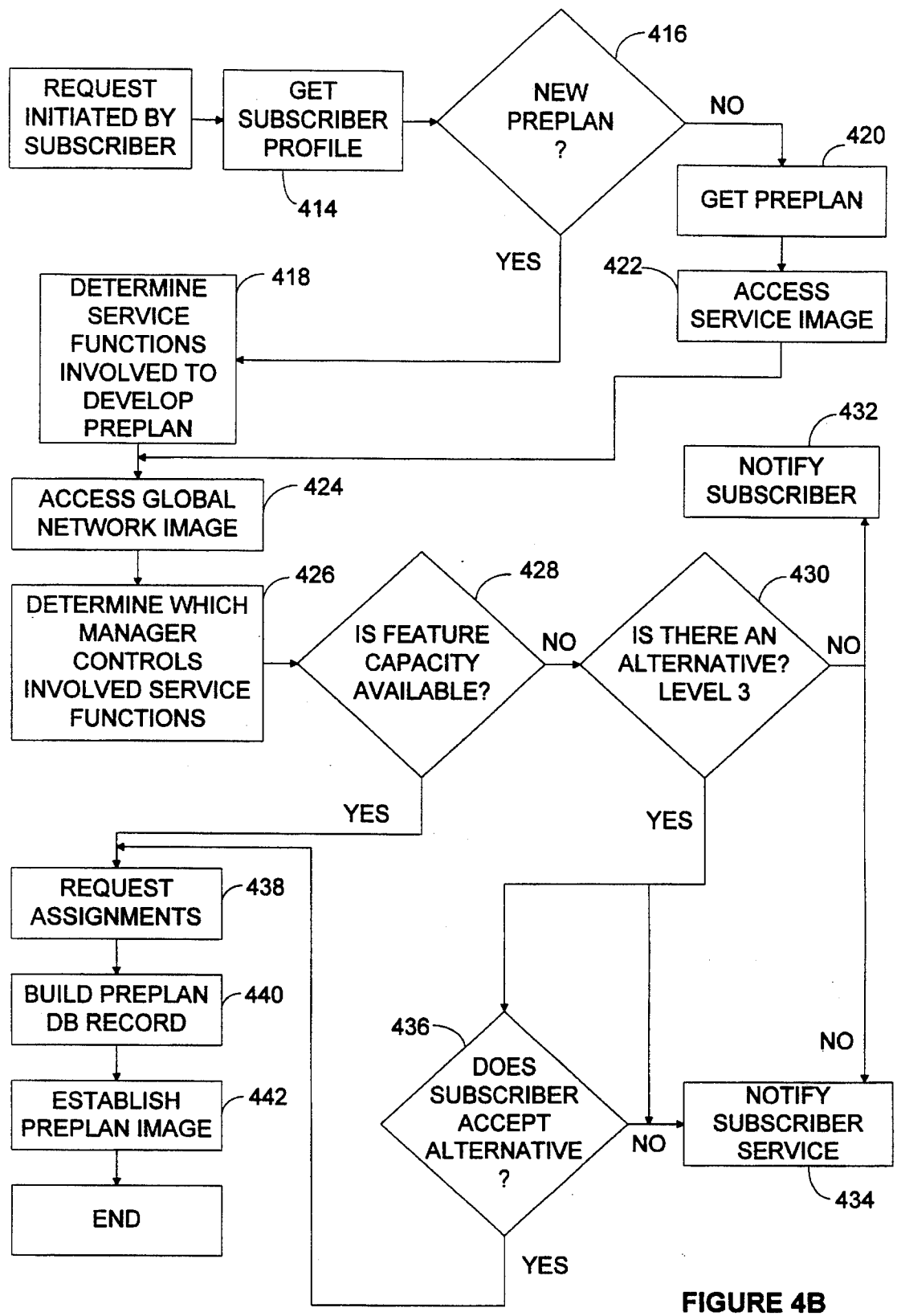
FIG. 4B is a flow diagram illustrating the process changing a subscriber preplan in the service manager.

FIG. 4B is a flow diagram illustrating a process within service manager 38 for changing existing preplans in response to a subscriber request. This process enters at step 414 which retrieves the subscribers profile from database 56 in access manager 36. Step 416 then asks whether the requested preplan is new. If yes, step 418 determines which service element managers 40 are involved for developing this new preplan.

If the answer in step 414 is no indicating that the request does not concern a new preplan, step 420 retrieves the appropriate preplan from database 68 and service manager 38. The appropriate service image is then accessed in step 422 by way of service function coordination and validation 66.

After steps 418 or 422, step 424 accesses the network image from database 60 and step 426 then determines which service element managers 40 are involved with the particular preplan. Step 428 then asks whether the capacity is available in service element managers 40 to initiate the requested preplan. If no, step 430 asks whether an alternative exists. If no, steps 432 and 434 notify the subscriber and subscriber service respectively. If an alternative does exist, subscriber service is notified in step 434 and step 436 then asks whether the subscriber accepts the alternative. If no, subscriber services notified in step 434.

If the answer in step 428 is yes, indicating that the desired capacity is available, or the subscriber accepts the alternative in step 436, step 438 requests assignments of the appropriate service element managers 40. Step 440 then builds the appropriate preplan database record and step 442 establishes the preplan image which is stored in database 68.

Figure 4C:
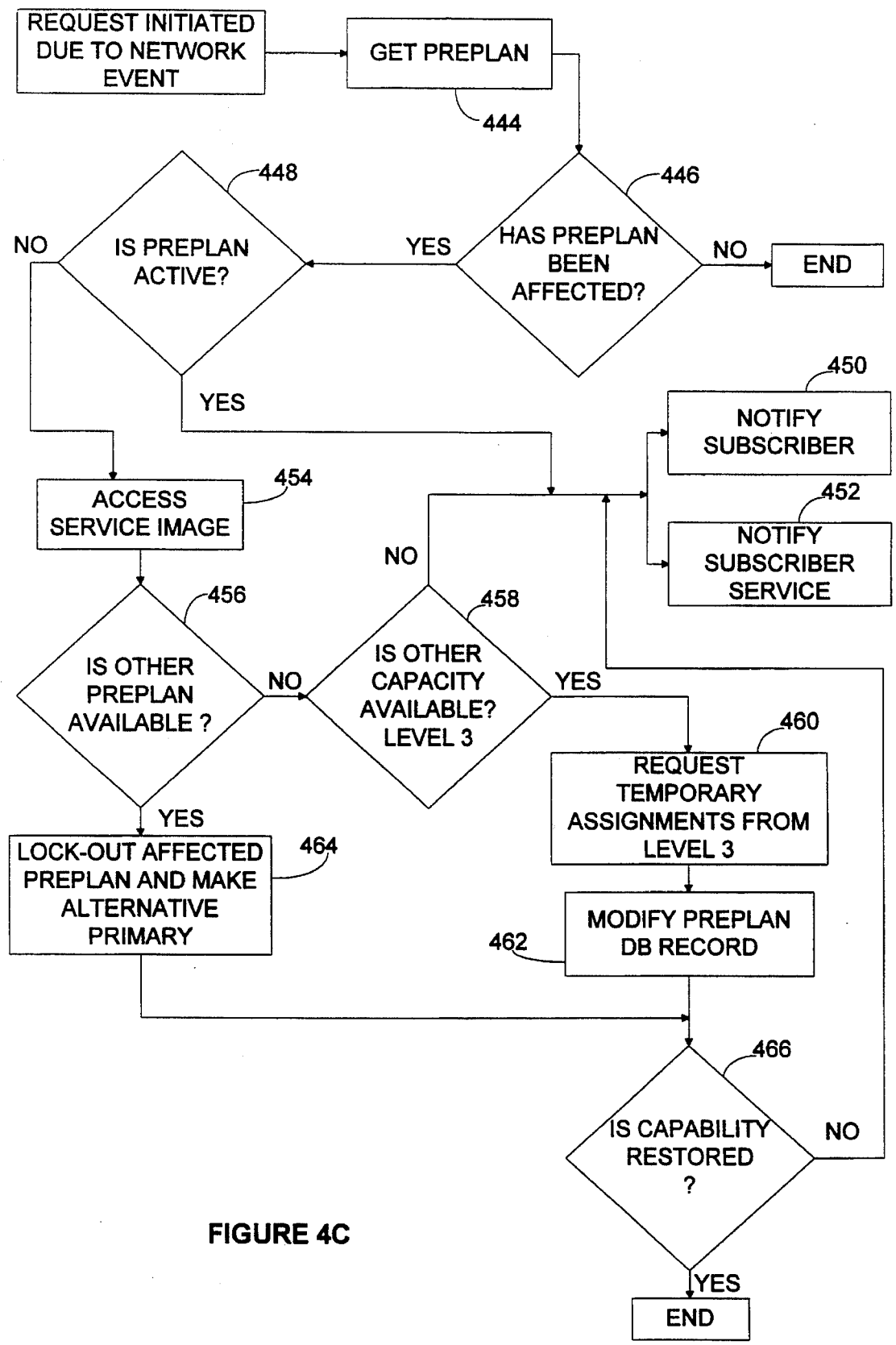
FIG. 4C is a flow diagram illustrating the process for revalidating a preplan in the service manager.

FIG. 4C illustrates the process for re-validating all preplans in response to a network event affecting communications services over network 10. This process is initiated automatically by global decision making 72 in service manager 38 and enters at step 444 which retrieves each preplan in turn from database 68. Step 446 then asks whether the retrieved preplan has been affected by the network event. If no, no modification is necessary and the process for this preplan ends.

If the answer in step 446 is yes, step 448 asks whether the preplan is active, that is, whether this preplan is currently in service and running. If yes, the subscriber of the preplan is notified in step 450 and subscriber service is notified in step 452.

If the answer in step 448 is no, service function coordination and validation 66 accesses the appropriate image and then, along with global decision making 72 asks whether another preplan is available in step 456. If no, global decision making 72 determines in step 458 whether other capacity is available from among service element managers 40. If no, the subscriber and subscriber service are notified in steps 450 and 452. If other capacity is available, service function coordination and validation 66 requests temporary assignment of other managers 40 to modify the preplan database record by preplan validation and maintenance 70 in step 462.

If the answer in step 456 is yes, indicating that another preplan is available, preplan validation and maintenance 70 in step 464 locks out the affected preplan and designates the alternative as the primary preplan. After steps 462 or 464, global decision making 72 determines whether network capability has been restored in step 466. If no, the program loops to steps 450 and 452. If yes, the process ends.

Figure 4D:
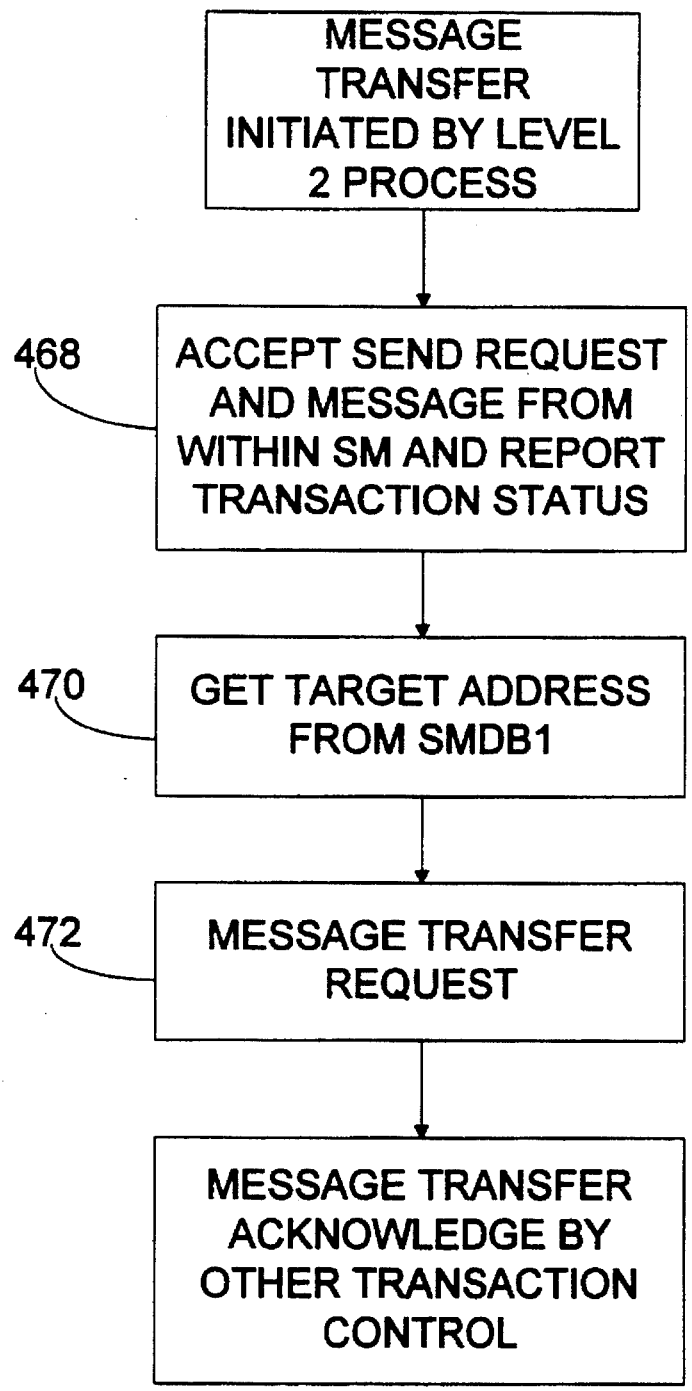
FIG. 4D is a flow diagram illustrating the process for controlling a transaction initiated by the service manager.

FIG. 4D illustrates transaction control for a message initiated within service manager 38. The process enters at step 468 in which transaction control 58 accepts a message send request and reports the transaction status. In step 470, transaction control 58 retrieves the address of the destination for the message from image database 60 and in step 472 initiates a message transfer request. The process ends upon acknowledgement of message receipt by the transaction control of the destination.

Figure 4E:
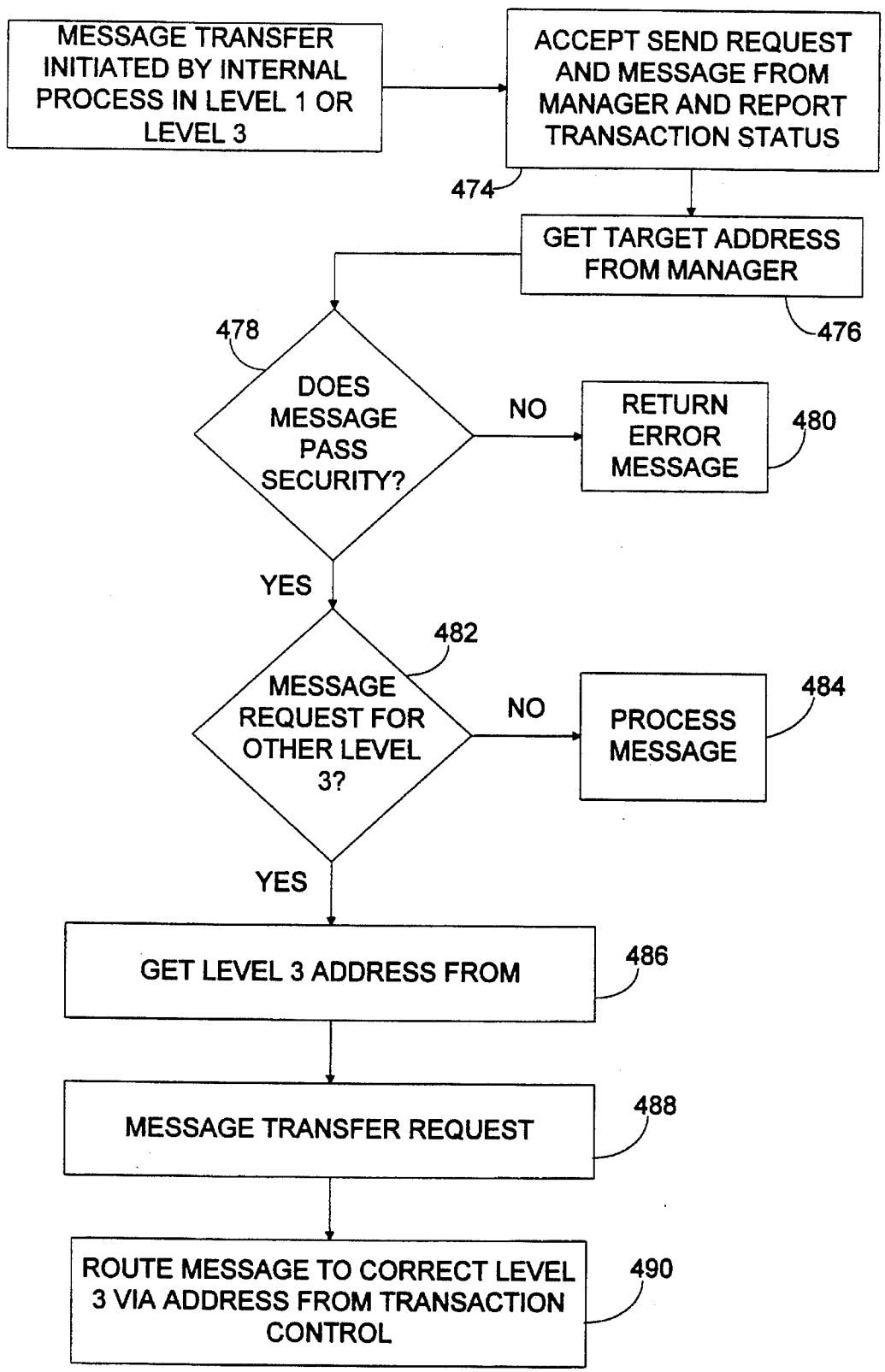
FIG. 4E is a flow diagram illustrating the process for controlling a transaction in the service manager initiated by the access manager or service module.

FIG. 4E illustrates transaction control within service manager 38 for a message transfer initiated by access manager 36 or service element managers 40. This process enters at step 474 in which transaction control 58 acknowledges the message transfer request initiated by access manager 36 or service element managers 40. The reason for the message and the process that the message is intended for is determined by service function coordination and validation 66 in step 476.

In step 478, transaction control 58 determines whether the message passes security based in the reason and destination of the message. If no, an error message is returned in step 480. If yes, in step 482, service function coordination and validation 66 either processes the message internal to service manager 38 in step 484 or locates the appropriate service element managers 40 in step 488 from global network image database 60 and initiates a message transfer request through transaction control 58 in step 486. In step 490, the message is transferred to the appropriate service element managers 40.

Figure 5:
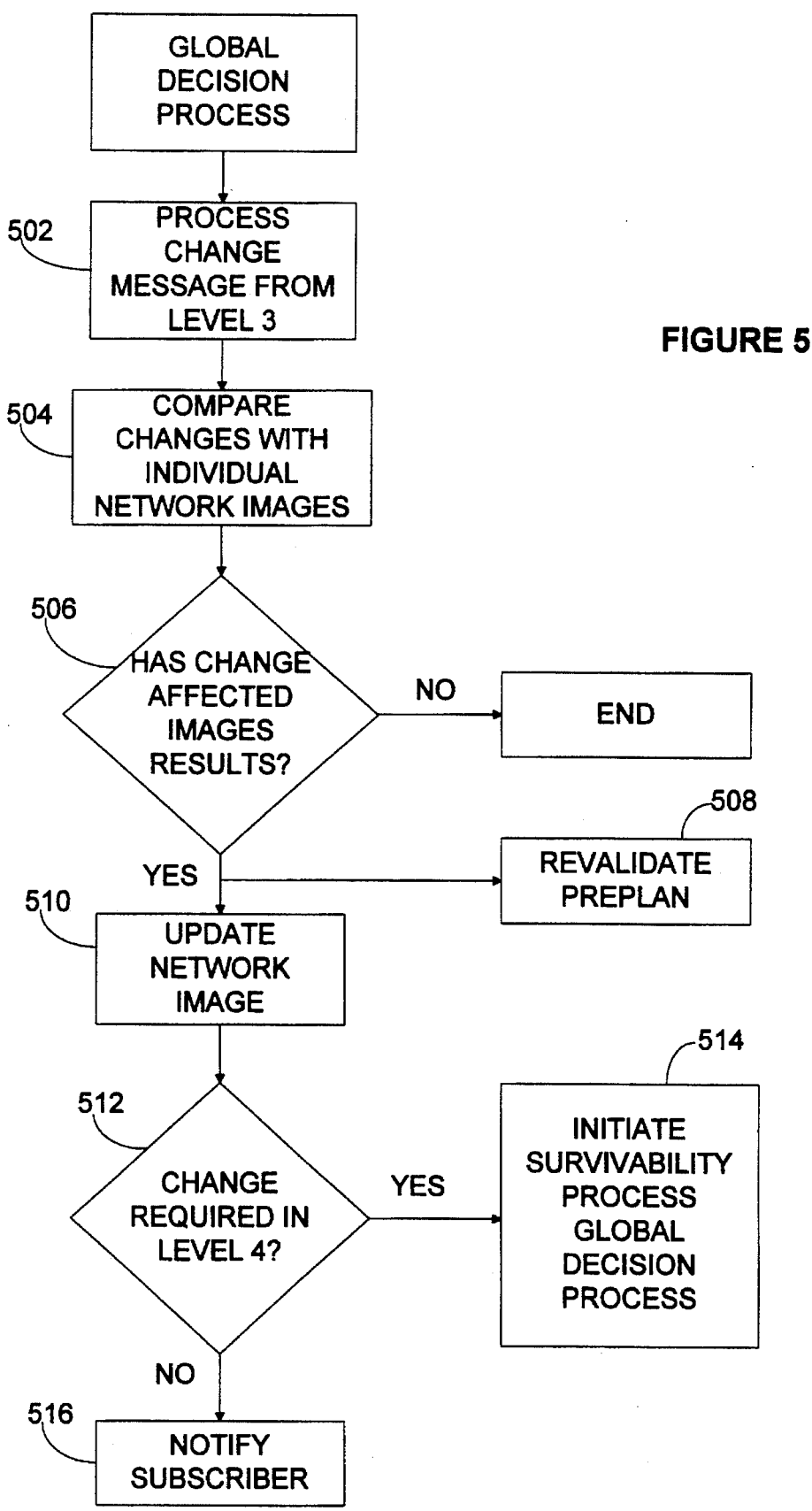
FIG. 5 is a flow diagram illustrating the process for a global decision in the service manager.

FIG. 5 illustrates the process for global decision making within service manager 38. The process enters at step 502 in which service function coordination and validation 66 processes a change message when received from service element managers 40. Such a change might concern a network trouble or a reconfiguration of a module. In step 504, global decision making 72 then compares changes represented by the message with individual network images in image database 60, and in step 506 determines whether the change has affected the stored images. If no, the process ends.

If the answer in step 506 is yes, preplan validation and maintenance 70 re-validates (FIG. 4C) existing preplans in view of the changes in step 508. Additionally, service function coordination and validation 66 updates the network image stored in database 60 in step 510.

Next, global decision making 72 determines in step 512 whether a change is required in network element 42 as a result of the change message and if yes, initiates survivability processes (FIG. 6) in step 512. If the answer in step 514 is no, the subscriber is notified in step 516.

Figure 6:
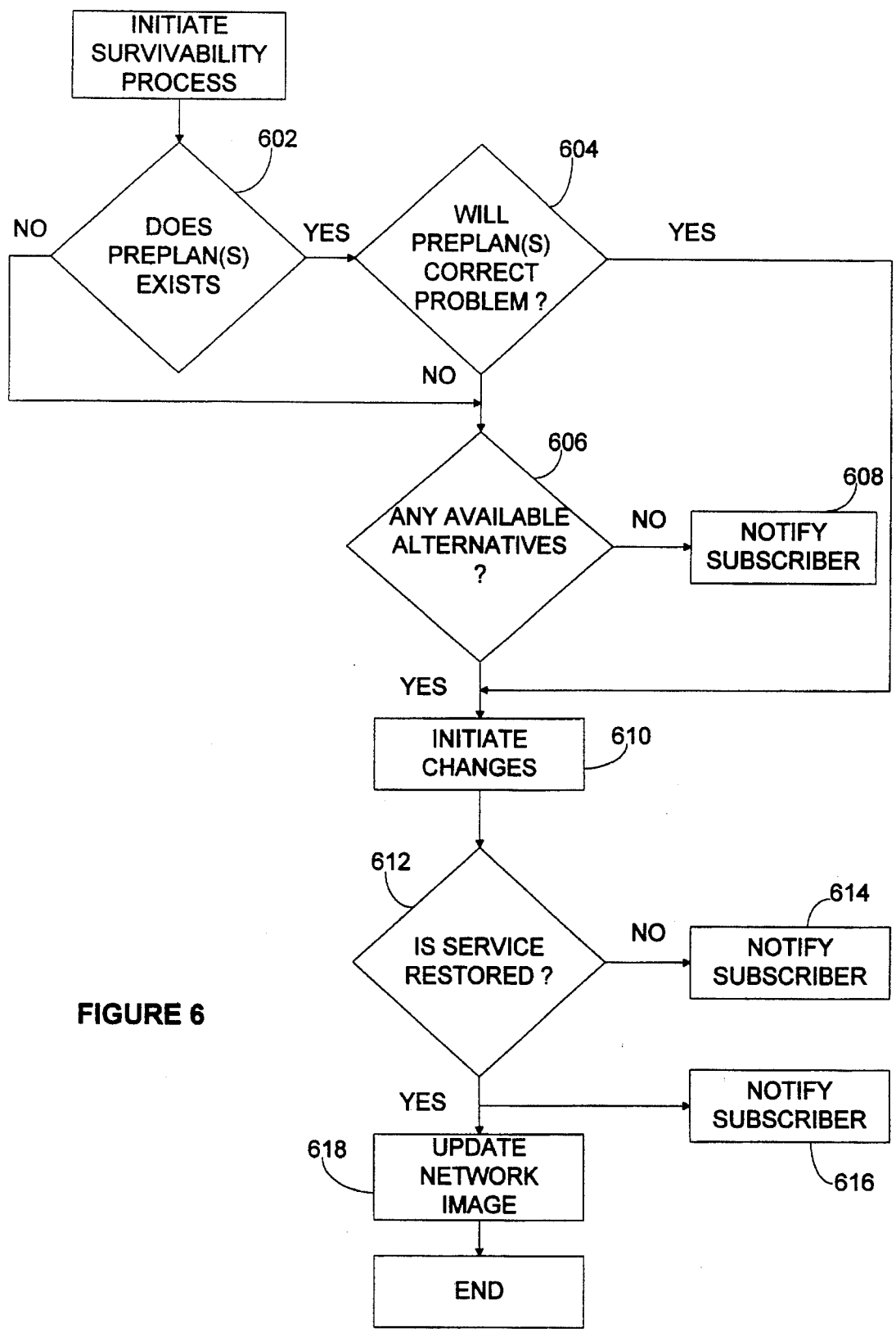
FIG. 6 is a flow diagram illustrating the process for survivability in the service manager.

FIG. 6 illustrates the process within service manager 38 for survivability actions in the event of change which affects network communications services. Initially in step 602 preplan validation and maintenance 70 determines whether preplans exist to compensate for the network change. If yes, global decision making 72 determines in step 604 whether the preplans will correct the problem.

If the answer in either steps 602 or 604 is no, global decision making 72 determines in step 606 whether any other alternatives are available. If no, the subscriber is notified in step 608. If the answer in step 606 is yes, global decision making 72 initiates in step 610 the available alternatives and in step 612 determines whether the service has been restored. If no, the subscriber is so notified in step 614. If the answer in step 612 is yes, the subscriber is also notified in step 616 and in step 618 service function coordination and validation 66 updates the network image whereupon the process ends.

Figure 7:
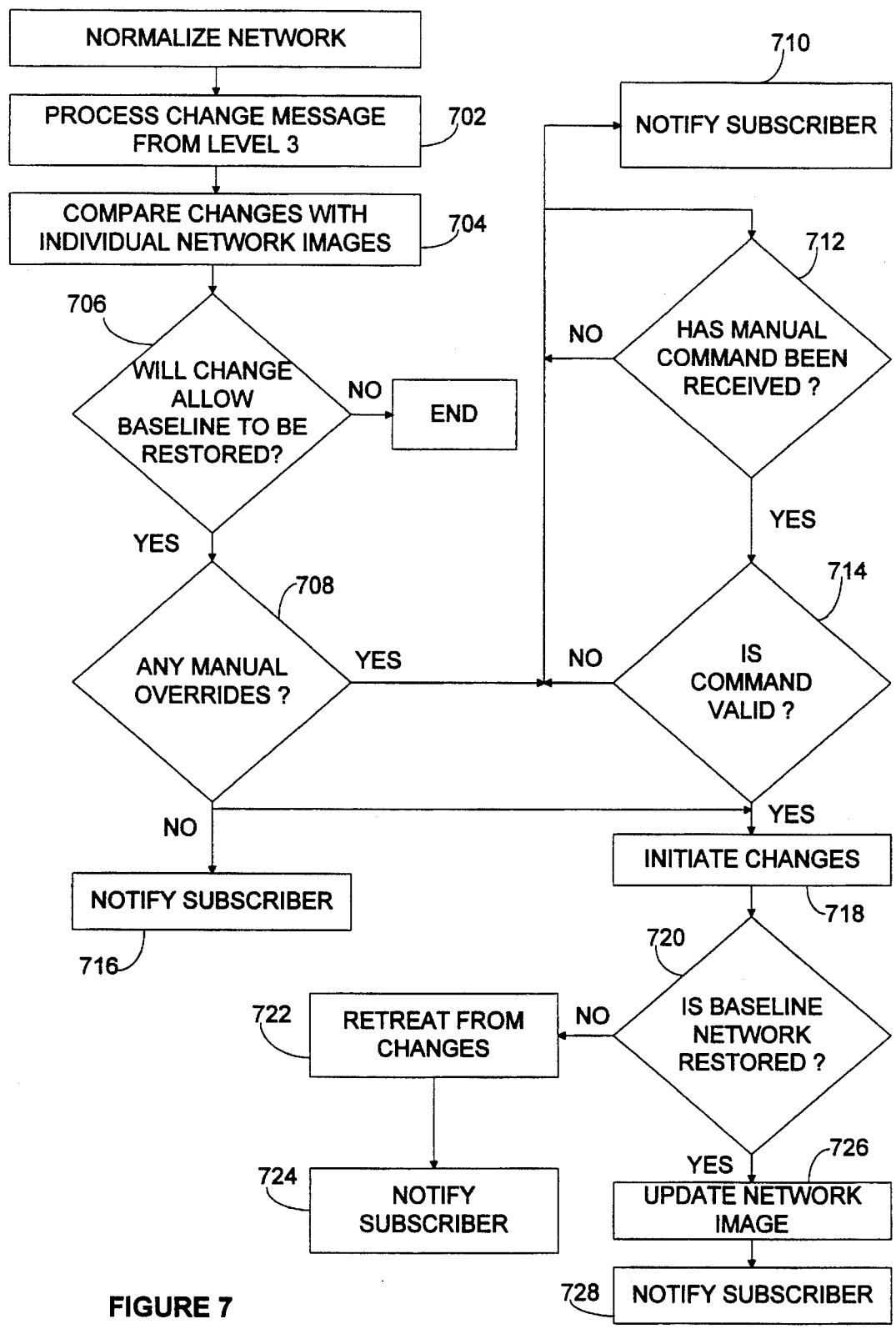
FIG. 7 is a flow diagram illustrating an additional global decision process in the service manager.

FIG. 7 is a flow chart illustrating the operational process for global decision making 72 for returning the network to normal after activation of a preplan. This process enters at step 702 in which service function coordination and validation 66 processes change messages received from service element managers 40 and, in step 704, compares the changes with the network image stored in database 60. Step 706 then asks whether the change will allow the baseline to be restored as it existed before the network event prompting implementation of the preplans. If no, the process ends. If the answer in step 706 is yes, global decision making 72 determines whether any manual overrides have been activated in step 708. If yes, the subscriber is notified by transaction tracking 64 in step 710 and step 712 asks whether a manual command for override has been received. If not, the program continues to loop through step 712 until such a command has been received. The process then moves to step 714 in which service function coordination and validation 66 and global decision making 72 determine whether the manual command is valid. If not, the program loops back to step 712.

If the answer in step 708 is no indicating that no manual override has been implemented, the subscriber is so notified in step 716. Additionally, after step 708 or if the answer in step 714 is yes, service function coordination and validation 66 initiates the changes to restore the baseline or to implement the manual command in step 718.

Global decision making 72 then determines in step 720 whether the baseline network has been restored and if no, step 722 retreats from the implemented changes and notifies the subscriber in step 724. If baseline network has been restored, the answer in step 720 is yes, and service function coordination and validation 66 updates the network image in step 726 whereupon the subscriber is notified.

Figure 8:
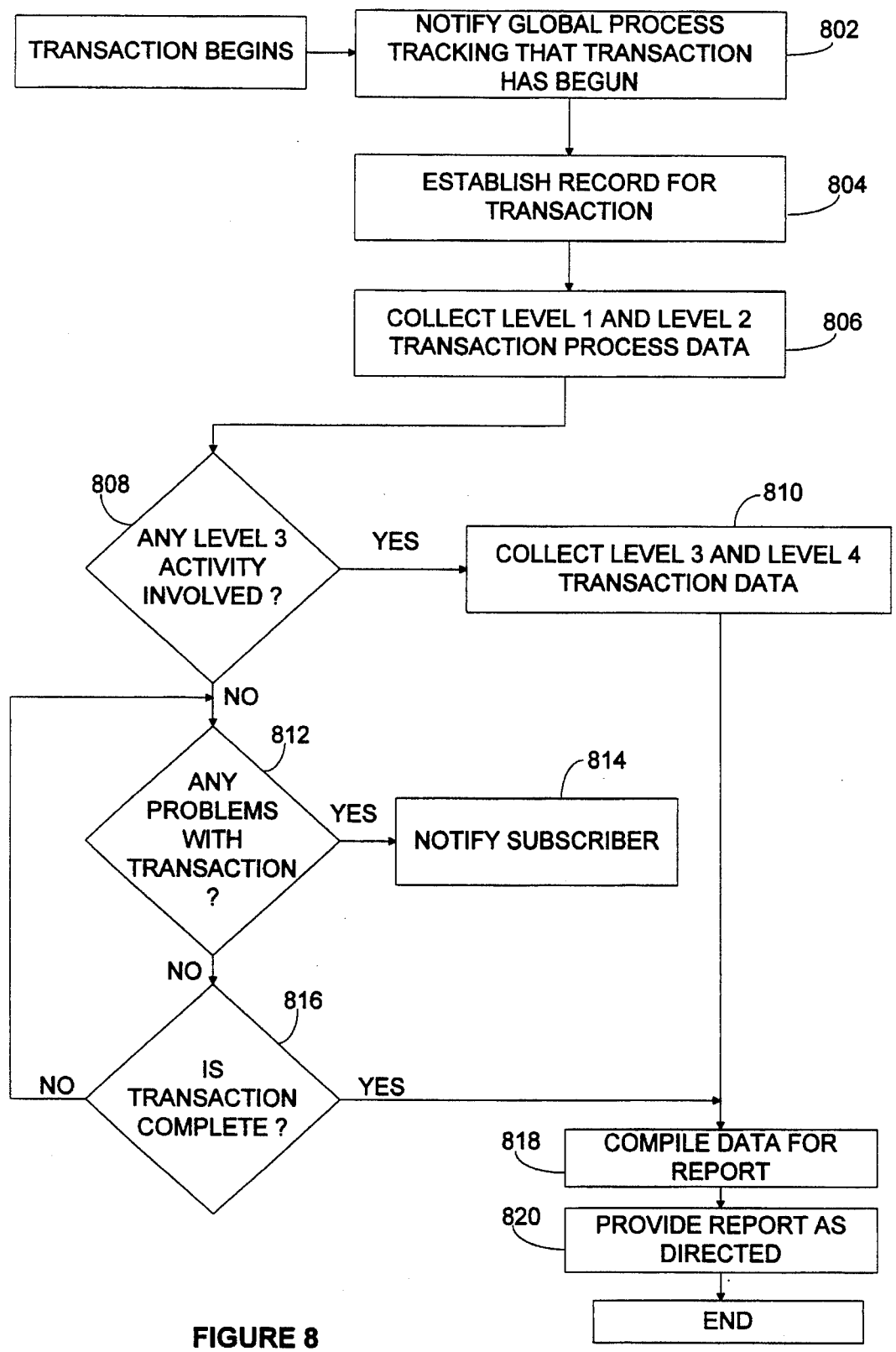
FIG. 8 is a flow diagram illustrating the global tracking process in the service manager.

FIG. 8 is a flow diagram illustrating the process for transaction tracking 64 in service manager 38. The process enters at step 802 in which transaction tracking 64 is notified that a transaction has begun. Such can be initiated by access manager 36 or one of service element managers 40. In step 804 transaction tracking 64 establishes a record for the transaction and then in step 806 collects transaction process data from access exception 52 in access manager 36 and from transaction audit 74 in service manager 38.

Step 808 then asks whether the transaction involves any activity by service element managers 40. If yes, transaction tracking 64 then collects the appropriate data in step 810 from throughout the operational architecture.

If the answer in step 808 is no, transaction tracking 64 then asks whether any problems have occurred in connection with the transaction. If yes, the subscriber is so notified in step 814. If the answer in step 812 is no, step 816 then asks whether the transaction is complete, and if no, the process loops back to step 812. If the answer in step 816 is yes, or after step 810, transaction tracking 64 compiles data for a transaction report in step 818 and delivers the report in step 820.

Having thus described the preferred embodiment of the present invention, the following is claimed as new and desired to be secured by Letters Patent:

We claim:

1. In a telecommunications network operable for providing communications services using network elements, a method of operating the network comprising the steps of:
   (a) configuring a plurality of service modules operable for processing service requests concerning corresponding communications services;
   (b) receiving service requests concerning communications services into the network by way of a service manager configured so that substantially all of said requests received in the network are received within said service manager;
   (c) determining in said service manager in response to receipt of said requests which of said service modules are operable for processing said service requests and selecting said modules for receipt of said requests;
   (d) transferring said service requests from said service manager to said selected service modules in response to selection thereof;
   (e) receiving said service requests into said selected service modules and, in response, developing therein network instructions usable by network elements for implementing communications services corresponding to said service requests; and
   (f) providing said network instructions to said network elements in response to development thereof and thereby providing communications services in the network corresponding to said service requests.

2. The method as set forth in claim 1, further including the step of configuring an access manager for receiving said service requests before receipt thereof by said service manager.

3. The method as set forth in claim 2, further including the step of configuring said access manager for receiving service requests from subscribers of network communications services.

4. The method as set forth in claim 3, further including the step of configuring said access manager for determining whether a subscriber is authorized to present service requests to the network.

5. The method as set forth in claim 3, further including the step of configuring said access manager for storing information representative of allowable communications services for each subscriber and determining, in response to a service request from a subscriber, whether said service request corresponds to communications services allowable for that subscriber.

6. The method as set forth in claim 3, further including the step of configuring said access manager for interacting with subscriber terminals for data flow therebetween.

7. The method as set forth in claim 1, further including the step of configuring said service manager for storing information representative of predetermined communications services plans respectively associated with a subscriber of network communications services.

8. The method as set forth in claim 7, further including the step of configuring said service manager for implementing said predetermined plans in response to subscriber requests therefor.

9. The method as set forth in claim 7, further including the step of configuring said service manager for implementing certain ones of said predetermined plans in response to a disruption within the network affecting communications services without a service request therefor from the subscriber.

10. The method as set forth in claim 7, further including the step of configuring said service manager for designating certain ones of said predetermined plans in response to a disruption within the network affecting communications services.

11. The method as set forth in claim 1, further including the step of configuring said service manager for storing information in a database of substantially all communications services of the network implemented by way of said service modules.

12. The method as set forth in claim 1, further including the step of configuring at least one of said service modules for developing network instructions for implementing call direction services.

13. The method as set forth in claim 12, further including the step of configuring at least one of said service modules for developing network instructions for implementing special message routing arrangements.

14. The method as set forth in claim 12, further including the step of configuring at least one of said service modules for developing network instructions for implementing special circuit arrangements.

15. The method as set forth in claim 12, further including the step of configuring at least one of said service modules for developing network instructions for implementing special billing arrangements.

16. The method as set forth in claim 12, further including the step of configuring at least one of said service modules for developing network instructions for implementing special reporting formats.

17. The method as set forth in claim 12, further including the step of configuring at least one of said service modules for developing network instructions for implementing a selected bandwidth for telecommunications between an originating station and a called station.

18. The method as set forth in claim 1, said network elements including telecommunications switches, said method further including the step of developing said network instructions as switching instructions for switched services.

19. The method as set forth in claim 1, said network elements including means for defining a bandwidth for selected telecommunications transmissions, said method further including the step of developing said network instructions as instructions defining a selected bandwidth for selected transmissions.

* * * * *